US012394782B2

(12) United States Patent
Guan et al.

(10) Patent No.: US 12,394,782 B2
(45) Date of Patent: Aug. 19, 2025

(54) SILICON CARBON NEGATIVE ELECTRODE MATERIAL, NEGATIVE ELECTRODE SHEET, SECONDARY BATTERY, BATTERY MODULE, BATTERY PACK AND POWER CONSUMPTION APPARATUS (71) Applicant: CONTEMPORARY AMPEREX TECHNOLOGY (HONG KONG) LIMITED, Hong Kong (CN)

(72) Inventors: Yingjie Guan, Ningde (CN); Yuzhen Zhao, Ningde (CN); Qingyan Ma, Ningde (CN); Yan Wen, Ningde (CN); Qisen Huang, Ningde (CN); Fenggang Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 524 days.

(21) Appl. No.: 17/888,497

(22) Filed: Aug. 16, 2022

(65) Prior Publication Data
US 2023/0146274 A1 May 11, 2023

Related U.S. Application Data (63) Continuation of application No. PCT/CN2021/120755, filed on Sep. 26, 2021.

(51) Int. Cl.
H01M 4/36 (2006.01)
H01M 4/02 (2006.01)
(Continued)

(52) U.S. Cl.
CPC ......... H01M 4/364 (2013.01); H01M 4/0471 (2013.01); H01M 4/386 (2013.01);
(Continued)

(58) Field of Classification Search
None
See application file for complete search history.

(56) References Cited

FOREIGN PATENT DOCUMENTS

| CN | 105283986 A | 1/2016 |
|---|---|---|
| CN | 110165187 A | 8/2019 |

(Continued)

OTHER PUBLICATIONS

Meng Kui et al: "Self-assembly of porous graphite/silicon/carbon composites for lithium-ion batteries", Powder Technology, Elsevier, Basel (CH), vol. 254, Jan. 25, 2014 (Jan. 25, 2014), pp. 403-406, XP028620728, ISSN: 0032-5910, DOI: 10.1016/J.POWTEC.2014.01.051.

(Continued)

Primary Examiner — Niki Bakhtiari
Assistant Examiner — Dustin Van Kirk
(74) Attorney, Agent, or Firm — XSENSUS LLP (57) ABSTRACT The present application provides a silicon carbon negative electrode material, a negative electrode sheet including the same, a secondary battery, a battery module, a battery pack and a power consumption apparatus. A battery composed of a negative electrode prepared by the silicon carbon negative electrode material in the present application as a working electrode, metal lithium as a counter electrode and an electrolyte containing a lithium ion conductive substance may be charged and discharged, and in a case of drawing a relationship graph between a differential value dQ/dV obtained by differentiating a charging and discharging capacity Q by a working electrode potential V and the working electrode potential V, when energizing the negative electrode material in a direction of delithiation, a ratio of a maximum Y of dQ/dV between 400-480 mV to a maximum X of dQ/dV between 200-255 mV may be in a range of 3.5 to 15.

4 Claims, 3 Drawing Sheets (51) Int. Cl.
    *H01M 4/04*         (2006.01)
    *H01M 4/38*         (2006.01)
    *H01M 4/587*       (2010.01)
    *H01M 4/62*         (2006.01)

(52) U.S. Cl.
    CPC ........... *H01M 4/587* (2013.01); *H01M 4/622* (2013.01); *C01P 2002/70* (2013.01); *C01P 2002/74* (2013.01); *C01P 2004/61* (2013.01); *C01P 2006/12* (2013.01); *C01P 2006/16* (2013.01); *H01M 2004/021* (2013.01); *H01M 2004/027* (2013.01)

(56) References Cited

FOREIGN PATENT DOCUMENTS

| CN | 110828812 A | 2/2020 |
|---|---|---|
| JP | 2017-188319 A | 10/2017 |
| JP | 2018-147772 A | 9/2018 |
| KR | 2019-0074313 A | 6/2019 |
| WO | 2013/042421 A1 | 3/2013 |
| WO | 2021/082291 A1 | 5/2021 |

OTHER PUBLICATIONS

Shi Jiewen et al: "Core-shell structured Si@C nanocomposite for high-performance Li-ion batteries with a highly viscous gel as precursor", Journal of Power Sources, Elsevier, Amsterdam, NL, vol. 438, Aug. 14, 2019 (Aug. 14, 2019), XP 085821845, ISSN: 0378-7753, DOI: 10. 1016/J. JPOWSOUR. 2019.227001.
Extended European Search Report issued Nov. 22, 2023 in European Patent Application No. 21927056.8.
Office Action issued Dec. 19, 2024 in Korean Patent Application No. 10-2022-7029851 with English translation thereof.
International Search Report and Written Opinion mailed on Jun. 16, 2022, received for PCT Application PCT/CN2021/120755, filed on Sep. 26, 2021, with English translation, 15 pages.

SILICON CARBON NEGATIVE ELECTRODE MATERIAL, NEGATIVE ELECTRODE SHEET, SECONDARY BATTERY, BATTERY MODULE, BATTERY PACK AND POWER CONSUMPTION APPARATUS

CROSS REFERENCE TO RELATED APPLICATION

The present application is a continuation of International Application No. PCT/CN2021/120755, filed Sep. 26, 2021, the entire content of which is incorporated herein by reference in its entirety.

TECHNICAL FIELD

The present application relates to the field of lithium battery technologies, and in particular to a silicon carbon negative electrode material and a preparation method thereof, a negative electrode sheet including the same, a secondary battery, a battery module, a battery pack and a power consumption apparatus.

BACKGROUND

In recent years, with wider application of lithium ion batteries, the lithium ion batteries are widely applied to energy storage power systems, such as water power, heat power, wind power and solar power stations, as well as many fields, such as electrical tools, electric bicycles, electric motorcycles, electric vehicles, military equipment and aerospace. Among negative electrode materials of the lithium ion batteries, a silicon carbon negative electrode material has attracted much attention since silicon has an extremely high theoretical specific capacity, a low lithium storage reaction platform, wide distribution in nature, and other advantages. However, with increasing requirements for battery performance, how to further improve gram capacity, first coulombic efficiency and cycle performance of a silicon carbon negative electrode material battery is still an urgent issue to be solved.

SUMMARY

The present application is made in view of the above problem, which aims to provide a silicon carbon negative electrode material, so that a battery using the silicon carbon negative electrode material has higher first coulombic efficiency, better cycle performance and fast charging performance.

In order to achieve the above purpose, the present application provides a silicon carbon negative electrode material and a preparation method thereof, a negative electrode sheet including the same, a secondary battery, a battery module, a battery pack and a power consumption apparatus.

A first aspect of the present application provides a silicon carbon negative electrode material, where a battery composed of a negative electrode prepared by the silicon carbon negative electrode material as a working electrode, metal lithium as a counter electrode and an electrolyte containing a lithium ion conductive substance is charged and discharged, and in a case of drawing a relationship graph between a differential value $dQ/dV$ obtained by differentiating a charging and discharging capacity Q by a working electrode potential V, and the working electrode potential V, when energizing the negative electrode material in a direction of delithiation, a ratio of a maximum Y of $dQ/dV$ between 400-480 mV to a maximum X of $dQ/dV$ between 200-255 mV is 3.5-15, optionally 4-9, and more optionally 4.5-6.5.

The battery using the silicon carbon negative electrode material in the present application has high gram capacity, high first coulombic efficiency and fine cycle performance at the same time.

In any embodiment, optionally, in an X-ray diffraction pattern (XRD pattern) of the silicon carbon negative electrode material in the present application, a ratio of an intensity of a peak at 28.4 at 2θ to an intensity of a peak at 54.6 at 2θ is 1.1-4.5.

In any embodiment, optionally, a content of the silicon is 2.5%-10%, optionally 3%-7%, based on a total weight of the silicon carbon negative electrode material. When the content of the silicon is within the above range, the battery using the silicon carbon negative electrode material in the present application has the high gram capacity and fine cycle performance at the same time.

In any embodiment, optionally, a median particle size Dv50 of the silicon carbon negative electrode active material is 10 μm-15 μm, optionally 11 μm-14 μm. If the median particle size of the silicon carbon negative electrode material is too large, it may lead to lithium evolution during a cycle and deteriorate cycle performance, while if the median particle size of the silicon carbon negative electrode material is too small, it may also lead to increased compaction density and insufficient electrolytic solution infiltration of the active material and also deteriorate the cycle performance.

In any embodiment, optionally, the silicon carbon negative electrode material has no pores or the number of pores with a diameter greater than 50 nm in a single silicon carbon negative electrode material particle is less than 10. When the number of pores of the silicon carbon negative electrode material is within the above range, it will help to reduce a side reaction at a pore interface, thereby increasing the first coulombic efficiency and improving the cycle performance.

In any embodiment, optionally, a specific surface area of the silicon carbon negative electrode material is 1 $m^2$-3 $m^2$, optionally 1.1 $m^2$-2 $m^2$. When the specific surface area of the silicon carbon negative electrode material is within the above range, it has an appropriate number of reactive active sites, which helps to reduce the side reaction and improve dynamic performance.

A second aspect of the present application provides a preparation method of a silicon carbon negative electrode material, including the following steps:

providing a silicon source and a carbon source;

adding the silicon source and the carbon source into an additive solution, evenly mixing, and then removing a solvent to obtain a muddy mixture;

heating the muddy mixture to obtain a silicon carbon negative electrode material intermediate; and heating the silicon carbon negative electrode material intermediate in an inert gas atmosphere to obtain the silicon carbon negative electrode material, where a battery composed of a negative electrode prepared by the silicon carbon negative electrode material as a working electrode, metal lithium as a counter electrode and an electrolyte containing a lithium ion conductive substance is charged and discharged, and in a case of drawing a relationship graph between a differential value $dQ/dV$ obtained by differentiating a charging and discharging capacity Q by a working electrode potential V and the working electrode potential V, when energizing the negative electrode material in a direction of delithiation, a ratio of a maximum Y of dQ/dV between 400-480 mV to a maximum X of dQ/dV between 200-255 mV is 3.5-15, optionally 4-9, and more optionally 4.5-6.5.

The preparation method of the present application has advantages of simple process, wide source of raw materials and low cost, which is conducive to large-scale industrial application.

In any embodiment, optionally, a median particle size Dv50 of the silicon source is 1 μm-3 μm, and a median particle size Dv50 of the carbon source is 8 μm-14 μm. When the median particle size of the silicon source and the carbon source is within the above range, the prepared silicon carbon negative electrode material has a suitable particle size range, which helps to improve the cycle performance of the battery using the silicon carbon negative electrode material.

In any embodiment, optionally, the additive is selected from one or more of glucose, phenolic resin, sucrose, pitch, polyacrylonitrile, sodium carboxymethyl cellulose, polyvinylidene fluoride, and polytetrafluoroethylene.

In any embodiment, optionally, a heating condition of the muddy mixture is: pretreatment at 100-400° C., optionally 100-300° C. for 2-6 hours. When the above condition is used for heat treatment, the prepared silicon carbon negative electrode material is more helpful to improve the cycle performance of the battery.

In any embodiment, optionally, a heat treatment condition of the silicon carbon negative electrode material intermediate in the inert gas atmosphere is heating at 600-1000° C. for 2-6 hours. When the treatment is performed under the above heat treatment condition, the prepared silicon carbon negative electrode material is more helpful to improve the cycle performance of the battery.

In any embodiment, optionally, the carbon source is selected from one or more of graphite, coke, activated carbon, diamond, and $C_{60}$, and may optionally graphite with a graphitization degree of 82%-97%.

In any embodiment, optionally, the silicon source is selected from one or more of elemental silicon, silicon oxide, and silicate, and may optionally the elemental silicon.

A third aspect of the present application provides a negative electrode sheet, including the silicon carbon negative electrode material according to the first aspect of the present application or the silicon carbon negative electrode material prepared by the method according to the second aspect of the present application.

A fourth aspect of the present application provides a secondary battery, including the silicon carbon negative electrode material according to the first aspect of the present application or the silicon carbon negative electrode material prepared by the method according to the second aspect of the present application or the negative electrode sheet according to the third aspect of the present application.

A fifth aspect of the present application provides a battery module, including the secondary battery according to the fourth aspect of the present application.

A sixth aspect of the present application provides a battery pack, including more than one of the secondary battery according to the fourth aspect of the present application or the battery module according to the fifth aspect of the present application.

A seventh aspect of the present application provides a power consumption apparatus, including more than one of the secondary battery according to the fourth aspect of the present application or the battery module according to the fifth aspect of the present application or the battery pack according to the sixth aspect of the present application.

The battery module, the battery pack or the power consumption apparatus of the present application include the secondary battery according to the fourth aspect of the present application, and therefore have at least the same advantages as the secondary battery according to the fourth aspect of the present application.

DESCRIPTION OF REFERENCE SIGNS 1 battery pack; 2 upper box body; 3 lower box body; 4 battery module; 5 secondary battery; 51 housing; 52 electrode assembly; 53 top cover assembly

DESCRIPTION OF EMBODIMENTS

Embodiments that specifically disclose a negative electrode active material and a preparation method thereof, a negative electrode sheet, a secondary battery, a battery module, a battery pack and an electrical apparatus of the present application will be described below in detail with reference to the accompanying drawings as appropriate. However, unnecessary detailed descriptions may be omitted in some cases. For example, detailed description for a well-known matter or repeated description for a practically identical structure may be omitted. This is to avoid the following description to become unnecessarily redundant and to facilitate understanding by those skilled in the art. In addition, the drawings and the following description are provided for those skilled in the art to fully understand the present application, and are not intended to limit the subject matter described in the claims.

The "ranges" disclosed in the present application is defined in the form of lower limits and upper limits, a given range is defined by selection of a lower limit and an upper limit, and the selected lower and upper limits define the boundaries of a specific range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of combination of these numerical values. In addition, when a certain parameter is expressed as an integer it is equivalent to disclosing that the parameter is, for example, an integer of 2, 3, 4, 5, 6, 7, 8, 9, 10, 11, 12, or the like.

Unless otherwise illustrated, all the embodiments and optional embodiments of the present application can be combined with each other to form new technical solutions.

Unless otherwise illustrated, all the technical features and optional technical features of the present application can be combined with each other to form new technical solutions.

Unless otherwise illustrated, all the steps of the present application can be performed sequentially or randomly, preferably sequentially. For example, the method includes steps (a) and (b), which indicates that the method may include sequentially performing the steps (b) and (a), or sequentially performing the steps (a) and (b). For example, the method may further include step (c), which means that step (c) may be added to the method in any order, for example, the method may include steps (a), (b) and (c), steps (a), (c) and (b), steps (c), (a) and (b), or the like.

Unless otherwise illustrated, the terms "comprising", and "containing" mentioned in the present application are open-ended or closed-ended. For example, the "comprising" and "containing" may mean that other components that are not listed may further be comprised or contained, or only listed components may be comprised or contained.

The terms "above", "below", "more than" or "less than" used in the present application include all numbers within that range including end values, for example, "more than one" means one or more, and "more than one of A and B" means "A", "B" or "A and B".

Unless otherwise illustrated, the term "or" is inclusive in the present application. For example, the phrase "A or B" indicates "A, B, or both A and B". More particularly, a condition "A or B" is satisfied by any one of the following: A is true (or present) and B is false (or not present); A is false (or not present) and B is true (or present); or both A and B are true (or present).

"Median particle size" is used synonymously with "median particle size (Dv50)" herein, which refers to the corresponding particle size when a cumulative particle size distribution percentage of particles reaches 50%. Physically, it means that the particles with a particle size larger than it account for 50%, and the particles with a particle size smaller than it also account for 50%, thus it also known as an average particle size.

In order to solve problems of low first coulombic efficiency, low gram capacity and poor cycle performance of a battery prepared from a silicon carbon negative electrode material in the prior art, inventors of the present application charge and discharge a battery composed of a negative electrode prepared by the silicon carbon negative electrode material as a working electrode, metal lithium as a counter electrode and an electrolyte containing a lithium ion conductive substance, and draw a relationship graph between a differential value dQ/dV obtained by differentiating a charging and discharging capacity Q by a working electrode potential V and the working electrode potential V. After extensive research, the inventors unexpectedly found that in the above relationship graph of the material, when a ratio of a maximum value Y of dQ/dV between 400-480 mV to a maximum value X of dQ/dV between 200-255 mV is 3.5-15, optionally 4-9, and more optionally 4.5-6.5, the secondary battery prepared by using the corresponding silicon carbon negative electrode material may have high gram capacity, high first coulombic efficiency and fine cycle performance at the same time.

[Silicon Carbon Negative Electrode Material]

A first aspect of the present application provides a silicon carbon negative electrode material, where a battery composed of a negative electrode prepared by the silicon carbon negative electrode material as a working electrode, metal lithium as a counter electrode and an electrolyte containing a lithium ion conductive substance is charged and discharged, and in a case of drawing a relationship graph between a differential value dQ/dV obtained by differentiating a charging and discharging capacity Q by a working electrode potential V and the working electrode potential V, when energizing the negative electrode material in a direction of delithiation, a ratio of a maximum Y of dQ/dV between 400-480 mV to a maximum X of dQ/dV between 200-255 mV is 3.5-15, optionally 4-9 4-9, and more optionally 4.5-6.5.

Although a mechanism is not yet clear, the inventors unexpectedly found screening a silicon carbon negative electrode material with a ratio of Y to X within the above range may improve the gram capacity, first coulombic efficiency and cycle performance of a battery including the silicon carbon negative electrode material.

In some embodiments, optionally, in an X-ray diffraction pattern of the silicon carbon negative electrode material in the present application, a ratio of an intensity of a peak at 28.4 at 2θ to an intensity of a peak at 2θ at 54.6 is 1.1-4.5.

A XRD test of the silicon carbon negative electrode material in the present application may be tested by referring to a method commonly used by those skilled in the art, for example, the test may be performed according to JIS K0131-1996 General Rules for X-ray Diffraction Analysis. Another example is to use a Bruker D8 Discover X-ray diffractometer from Bruker A×S, Germany, with a CuKα ray as a radiation source, a ray wavelength λ=1.5406 Å, a scanning 2θ angle range is 20°~80°, and a scanning rate is 4°/min.

In some embodiments, optionally, a content of the silicon in the silicon carbon negative electrode material is 2.5%-10%, optionally 3%-7%, based on a total weight of the silicon carbon negative electrode material.

The silicon is beneficial to improve the gram capacity of the silicon carbon negative electrode material, thereby improving an energy density of the battery, but the silicon should not be too much, excessive silicon may lead to poor expansion and contraction performance of the silicon carbon negative electrode material, and the silicon carbon negative electrode material loss electrical contact with a current collector due to expansion, thereby impairing the cycle performance of the battery. In addition, excessive silicon content may also cause a gap at bonding between particles become larger, resulting in increased rebound of an electrode sheet.

In some embodiments, optionally, a content of carbon in the silicon carbon negative electrode material is 80%-97.5%, optionally 90%-96.5%, based on the total weight of the silicon carbon negative electrode material.

The carbon is beneficial to alleviate deterioration of the expansion and contraction performance of the negative electrode material caused by the silicon, thereby improving the cycle performance of the battery. However, excessive carbon content may cause the decreased gram capacity of the negative electrode material, thereby decreasing the gram capacity of the battery.

In some embodiments, optionally, a median particle size Dv50 of the silicon carbon negative electrode material is 10 μm-15 μm, optionally 11 μm-14 μm.

If the median particle size of the silicon carbon negative electrode material is too large, on the one hand, it may be detrimental to rate performance of the battery due to the increased impedance, and on the other hand, lithium evolution may occur during the cycle and deteriorate the cycle performance of the battery. At the same time, excessively large median particle size of the silicon carbon negative electrode material may also cause the negative electrode material to undergo slight expansion and contraction, that is, loss the electrical contact with the current collector, resulting in the decreased coulombic efficiency and cycle performance. Similarly, if the median particle size of the silicon carbon negative electrode material is too small, on the one hand, electrochemical reaction sites of the material may increase, more SEI films are formed, and more active lithium is consumed, thereby resulting in the decreased first coulombic efficiency, and on the other hand, it may also result in the increased bonding between the particles, thereby leading to insufficient electrolytic solution infiltration of an active material and deterioration of the cycle performance.

It should be noted that the median particle size Dv50 of the silicon negative electrode material in the present application is a meaning known in the art, and may be measured by instruments and methods known in the art. For example, referring to GB/T 19077-2016 Particle size analysis-Laser diffraction methods, it can be conveniently measured by using a laser particle size analyzer, such as a Mastersizer 2000E laser particle size analyzer from Malvern Instruments Ltd., UK.

In any embodiment, optionally, the silicon carbon negative electrode material has no pores or the number of pores with a diameter greater than 50 nm in a single silicon carbon negative electrode material particle is less than 10.

The more pores of the silicon carbon negative electrode material, the more side reactions at a pore interface may be, and more active lithium and electrolytic solution are consumed, so that both the first coulombic efficiency and cycle performance decrease. At the same time, the pore may adsorb the electrolytic solution, resulting in the insufficient electrolytic solution infiltration of the active material, further deteriorating the cycle performance.

In the present application, a scanning electron microscope test of the silicon carbon negative electrode material may be performed according to a method commonly used in the art. For example, a ZEISS sigma 300 scanning electron microscope may be used to test, and then the test may be performed with reference to a standard JY/T010-1996.

In any embodiment, optionally, a specific surface area of the silicon carbon negative electrode material is $1\ m^2$-$3\ m^2$, optionally $1.1\ m^2$-$2\ m^2$ The larger the specific surface area of the silicon carbon negative electrode material, the more active sites in general, which may increase the side reactions and affect the cycle performance of the battery. Similarly, the smaller the specific surface area of the silicon carbon negative electrode material, the worse the kinetic performance may be, and simultaneously the lithium evolution of the battery may be caused, which deteriorates the cycle performance.

The specific surface area of the silicon negative electrode material in the present application has a known meaning in the art, and may be measured using the instruments and methods known in the art. For example, with reference to GB/T 19587-2017 determination of the specific surface area of solids by gas adsorption using the BET method, the test may be performed by using a method of nitrogen adsorption specific surface area analysis and test, and a calculation may be made by using a BET (Brunauer Emmett Teller) method to obtain the result, where the nitrogen adsorption specific surface area analysis and test may be performed by a Tri Star II 3020 specific surface area and a porosity analyzer from Micromeritics Company, United States.

A second aspect of the present application provides a method of preparing a silicon carbon negative electrode material, including the following steps:

providing a silicon source and a carbon source;

adding the silicon source and the carbon source into an additive solution, evenly mixing, and then removing a solvent to obtain a muddy mixture;

heating the muddy mixture to obtain a silicon carbon anode material intermediate; and heating the silicon carbon anode material intermediate in an inert gas atmosphere to obtain the silicon carbon negative electrode material, where a battery composed of a negative electrode prepared by the silicon carbon negative electrode material as a working electrode, metal lithium as a counter electrode and an electrolyte containing a lithium ion conductive substance is charged and discharged, and in a case of drawing a relationship graph between a differential value dQ/dV obtained by differentiating a charging and discharging capacity Q by a working electrode potential V and the working electrode potential V, when energizing the negative electrode material in a direction of delithiation, a ratio of a maximum Y of dQ/dV between 400-480 mV to a maximum X of dQ/dV between 200-255 mV is 3.5-15, optionally 4-9, and more optionally 4.5-6.5.

In any embodiment, optionally, a median particle size Dv50 of the silicon source is 1 μm-3 μm, and a median particle size Dv50 of the carbon source is 8 μm-14 μm.

When the median particle sizes of the silicon source and the carbon source are within the above ranges, the silicon carbon negative electrode material prepared by the method in the present application has the high gram capacity and fine cycle performance.

In any embodiment, optionally, the additive is selected from one or more of glucose, phenolic resin, sucrose, pitch, polyacrylonitrile, sodium carboxymethyl cellulose, polyvinylidene fluoride, and polytetrafluoroethylene.

In any embodiment, optionally, in the preparation method in the present application, the silicon source and the carbon source are evenly mixed in an additive solution by stirring.

In any embodiment, optionally, in the preparation method in the present application, a solvent in a mixture is removed by drying at 60-100° C.

In any embodiment, optionally, in the preparation method in the present application, a heating condition of the muddy mixture is: pretreatment at 100-400° C., optionally 100-300° C. for 2-6 hours.

In any embodiment, optionally, in the preparation method in the present application, a heat treatment condition of the silicon carbon negative electrode material intermediate in the inert gas atmosphere is heating at 600-1000° C. for 2-6 hours.

In any embodiment, optionally, in the preparation method in the present application, the carbon source is selected from one or more of graphite, coke, activated carbon, diamond, and $C_{60}$, and may optionally graphite with a graphitization degree of 82%-97%.

In any embodiment, optionally, in the preparation method in the present application, the silicon source is selected from one or more of elemental silicon, silicon oxide, and silicate, and may optionally the elemental silicon.

In any embodiment, optionally, a weight ratio of the added amount of the silicon source to the added amount of the carbon source is 2%-15%

In any embodiment, optionally, the addition amount of the additive is 3%-25%, based on a total weight of the silicon source, the carbon source and the additive.

[Negative Electrode Sheet]

A third aspect of the present application provides a negative electrode sheet, including the silicon carbon negative electrode material in the first aspect of the present application or the silicon carbon negative electrode material prepared by the method in the second aspect of the present application.

The negative electrode sheet includes a negative electrode current collector and a negative electrode film layer provided on at least one surface of the negative electrode current collector, and the negative electrode film layer includes a negative electrode active material.

As an example, the negative electrode current collector has two surfaces opposite in its own thickness direction, and the negative electrode film layer is provided on either or both of the two opposite surfaces of the negative electrode current collector.

In some embodiments, the negative electrode current collector may adopt metal foil or a composite current collector. For example, as the metal foil, copper foil may be used. The composite current collector may include a base layer of a polymer material and a metal layer formed on at least one surface of a base material of the polymer material. The composite current collector may be formed by forming metal materials (copper, copper alloys, nickel, nickel alloys, titanium, titanium alloys, silver and silver alloys, etc.) on the base material of the polymer material (such as polypropylene (PP), polyethylene terephthalate (PET), polybutylene terephthalate (PBT), polystyrene (PS), polyethylene (PE) and other base materials).

In some embodiments, in addition to the silicon carbon negative electrode material in the first aspect of the present application, the negative electrode active material may further include a negative electrode active material for a battery known in the art. As an example, the negative electrode active material may further include at least one of the following materials: artificial graphite, natural graphite, soft carbon, hard carbon, silicon-based material, tin-based material, lithium titanate, or the like. The silicon-based material may be selected from at least one of elementary silicon, silicon oxide compound, silicon carbon composite, silicon nitrogen composite, and silicon alloy. The tin-based material may be selected from at least one of elemental tin, tin oxide compound, and tin alloy. However, the present application is not limited to these materials, and other conventional materials that may be used as the negative electrode active material for the battery may also be used. One type of these negative electrode active materials may be used alone, or two or more types may be used in combination.

In some embodiments, the negative electrode film layer may also optionally include a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer may further optionally include a conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode film layer may also optionally include other additives, such as a thickener (such as sodium carboxymethyl cellulose (CMC-Na)), or the like.

In some embodiments, the negative electrode sheet may be prepared by dispersing the above components for preparing the negative electrode sheet, such as the silicon carbon negative electrode active material, the conductive agent, the binder, and any other components in a solvent (such as deionized water) to form a negative electrode slurry, coating the negative electrode slurry on the negative electrode current collector, and then conducting drying, cold pressing and other processes, so that the negative electrode sheet may be obtained.

[Positive Electrode Sheet]

In the present application, a secondary battery may be produced by using a negative electrode sheet and a positive electrode sheet including the silicon carbon negative electrode material in the present application, or a button battery may also be produced by using the negative electrode sheet and a counter electrode including the silicon carbon negative electrode material in the present application.

In some embodiments, optionally, the button battery is produced by using metallic lithium as the counter electrode.

In some embodiments, optionally, the secondary battery is produced by using the positive electrode sheet and the negative electrode sheet including the silicon carbon negative electrode material in the present application.

The positive electrode sheet includes a positive electrode current collector and a positive electrode film layer provided on at least one surface of the positive electrode current collector, and the positive electrode film layer includes the positive electrode active material in the first aspect of the present application.

As an example, the positive electrode current collector has two surfaces opposite in its own thickness direction, and the positive electrode film layer is provided on either or both of the two opposite surfaces of the positive electrode current collector.

In some embodiments, the positive electrode current collector may adopt metal foil or a composite current collector. For example, as the metal foil, aluminum foil may be used. The composite current collector may include a base layer of a polymer material and a metal layer formed on at least one surface of the base layer of a polymer material. The composite current collector may be formed by forming metal materials (aluminium, aluminium alloys, nickel, nickel alloys, titanium, titanium alloys, silver and silver alloys, etc.) on a base material of the polymer material (such as polypropylene (PP), polyethylene terephthalate (PET), polybutylene terephthalate (PBT), polystyrene (PS), polyethylene (PE) and other base materials).

In some embodiments, a positive electrode active material may use a positive electrode active material for a battery known in the art. As an example, the positive electrode active material may include at least one of the following materials: an olivine-structured lithium phosphate, a lithium transition metal oxide, and their respective modified compounds. However, the present application is not limited to these materials, and other conventional materials that may be used as the positive electrode active material for the battery may also be used. These positive electrode active materials may be used alone, or two or more types may be used in combination. Among them, examples of the lithium transition metal oxide may include, but are not limited to, one or more of lithium cobalt oxide (such as $LiCoO_2$), lithium nickel oxide (such as $LiNiO_2$), lithium manganese oxide (such as $LiMnO_2$, $LiMn_2O_4$), lithium nickel cobalt oxide, lithium manganese oxide, lithium nickel manganese oxide, lithium nickel cobalt manganese oxide ((such as $LiNi_{1/3}Co_{1/3}Mn_{1/3}O_2$ (also be abbreviated as $NCM_{333}$), $LiNi_{0.5}Co_{0.2}Mn_{0.3}O_2$ (also be abbreviated as $NCM_{523}$), $LiNi_{0.5}Co_{0.25}Mn_{0.25}O_2$ (also be abbreviated as $NCM_{211}$), $LiNi_{0.6}Co_{0.2}Mn_{0.2}O_2$ (also be abbreviated as $NCM_{622}$), $LiNi_{0.8}Co_{0.1}Mn_{0.1}O_2$ (also be abbreviated as $NCM_{811}$)), lithium nickel cobalt aluminum oxide (such as also be abbreviated as $LiNi_{0.85}Co_{0.15}Al_{0.05}O_2$) and their modified compounds. Examples of the lithium containing phosphate in the olivine structure may include, but are not limited to, at least one of lithium iron phosphate (such as $LiFePO_4$ (also be abbreviated as LFP)), a composite material of lithium iron phosphate and carbon, lithium manganese phosphate (such as $LiMnPO_4$), a composite material of lithium manganese phosphate and carbon, lithium manganese iron phosphate, and a composite material of lithium manganese iron phosphate and carbon.

In some embodiments, the positive electrode film layer may also optionally include a binder. As an example, the binder may include at least one of the following: polyvinylidene fluoride (PVDF), polytetrafluoroethylene (PTFE), vinylidene fluoride tetrafluoroethylene propylene terpolymer, vinylidene fluoride hexafluoropropylene tetrafluoroethylene terpolymer, tetrafluoroethylene hexafluoropropylene copolymer and fluoroacrylate resin.

In some embodiments, the positive electrode film layer may further optionally include a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode sheet may be prepared by dispersing the above components for preparing the positive electrode sheet, such as the positive electrode active material, the conductive agent, the binder, and any other components in a solvent (such as N-methylpyrrolidone) to form a positive electrode slurry, coating the positive electrode slurry on the positive electrode current collector, and then conducting drying, cold pressing and other processes, so that the positive electrode sheet may be obtained.

[Electrolyte]

An electrolyte plays a role of conducting ions between a positive electrode sheet and a negative electrode sheet. The type of the electrolyte is not specifically limited in the present application, and may be selected according to actual needs. For example, the electrolyte may be liquid, gelatinous or all solid.

In some embodiments, the electrolyte adopts an electrolytic solution. The electrolytic solution includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoroacetate borate, lithium borate oxalate, lithium difluorobisoxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone and two ethyl sulfone.

In some embodiments, the electrolytic solution may further optionally include an additive. For example, the additive may include a negative film-forming additive, a positive film-forming additive, and an additive that may improve certain performance of a battery, such as an additive improving overcharging performance of the battery, an additive improving high-temperature or low-temperature performance of the battery.

[Separator]

In some embodiments, a secondary battery further includes a separator. There is no particular limitation on the type of the separator in the present application, and any known porous-structure separator with a fine chemical stability and a mechanical stability may be selected.

In some embodiments, a material of the separator may be selected from at least one of glass fiber, non-woven fabric, polyethylene, polypropylene and polyvinylidene fluoride. The separator may be a single-layer thin film or a multi-layer composite thin film, and is not particularly limited. When the separator is a multi-layer composite thin film, materials of each layer may be the same or different, and are not particularly limited.

In some embodiments, a positive electrode sheet, a negative electrode sheet and the separator may be fabricated into an electrode assembly through a winding process or a lamination process.

[Secondary Battery]

A fourth aspect of the present application provides a secondary battery including the negative electrode active material in the first aspect of the present application or the negative electrode active material prepared by the method in the second aspect of the present application or the negative electrode sheet in the third aspect of the present application.

Generally, the secondary battery includes a positive electrode sheet, a negative electrode sheet, an electrolyte and a separator. During charging and discharging of a battery, active ions are intercalated and disintercalated back and forth between the positive electrode sheet and the negative electrode sheet. The electrolyte plays a role of conducting ions between the positive electrode sheet and the negative electrode sheet. The separator is provided between the positive electrode sheet and the negative electrode sheet, which mainly plays a role of preventing a short circuit between positive and negative electrodes and may simultaneously allow the ions to pass through.

In some embodiments, a lithium ion secondary battery may include an outer packing. The outer packing may be configured to package the above electrode assembly and electrolyte.

In some embodiments, the outer packing of the lithium ion secondary battery may be a hard housing, such as a hard plastic housing, an aluminum housing, a steel housing, or the like. The outer packing of the secondary battery may also be a soft package, for example, a soft bag package. A material of the soft package may be plastic, for example, the plastic may include polypropylene (PP), polybutylene terephthalate (PBT), polybutylene succinate (PBS), or the like.

In addition, the secondary battery, the battery module, the battery pack and the power consumption apparatus of the present application are described below with reference to accompanying drawings as appropriate.

Figure 1:
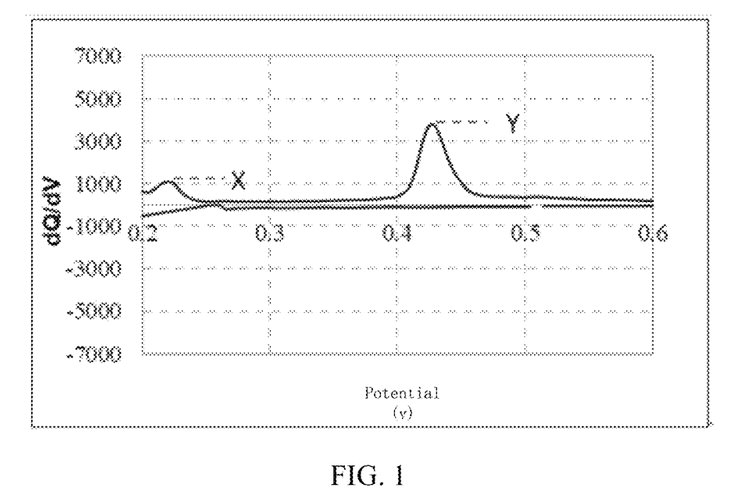
FIG. 1 is a relationship graph between a differential value dQ/dV obtained by differentiating a charging and discharging capacity Q by a working electrode potential V and the working electrode potential V.
Figure 2:
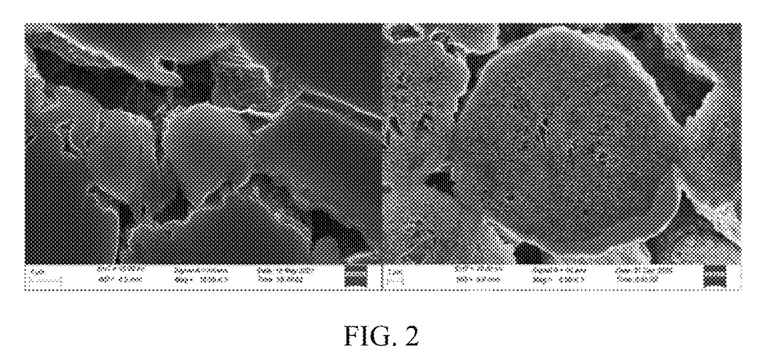
FIG. 2 is a scanning electron microscope (SEM, Scanning Electron Microscope) photograph of typical non-porous (left) and porous (right) silicon carbon negative electrode materials.
Figure 3:
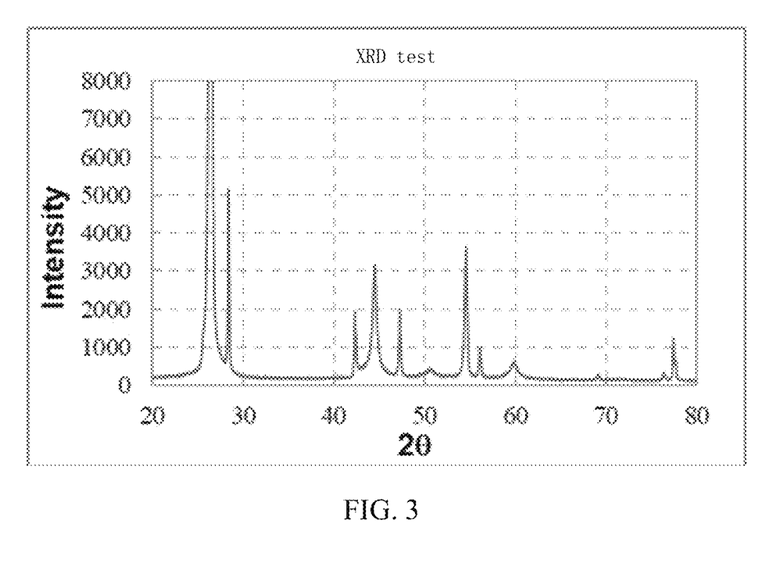
FIG. 3 is a XRD pattern of a silicon carbon negative electrode material of embodiment 1.
Figure 4:
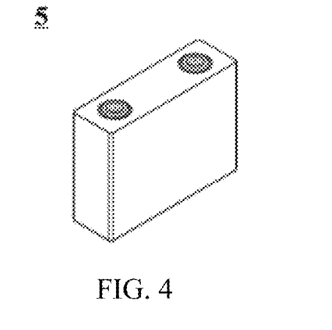
FIG. 4 is a schematic diagram of a secondary battery according to an embodiment of the present application.

The present application has no particular limitation on a shape of the secondary battery, and the secondary battery may be of a cylindrical, square, or any other shape. For example, FIG. 4 is a secondary battery 5 in a square structure as an example.

Figure 5:
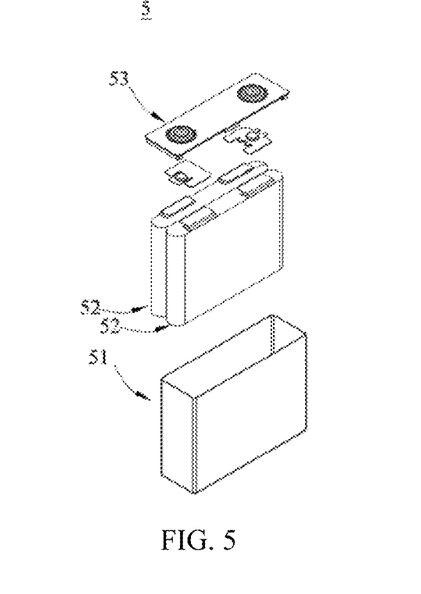
FIG. 5 is an exploded view of a secondary battery according to an embodiment of the present application shown in FIG. 4.

In some embodiments, with reference to FIG. 5, an outer packing may include a housing 51 and a cover plate 53. Among them, the housing 51 may include a bottom plate and side plates connected to the bottom plate, and the bottom plate and the side plates are enclosed to form an accommodating cavity. The housing 51 has an opening communicating with the accommodating cavity, and the cover plate 53 may cover the opening to close the accommodating cavity. A positive electrode sheet, a negative electrode sheet and a separator may form an electrode assembly 52 through a winding process or a lamination process. The electrode assembly 52 is packaged inside the accommodating cavity. An electrolytic solution is infiltrated in the electrode assembly 52. The number of electrode assemblies 52 included in a secondary battery 5 may be one or more, and those skilled in the art may select it according to specific actual needs.

In some embodiments, lithium ion secondary batteries may be assembled into a battery module, the number of lithium ion batteries included in the battery module may be one or more, and the specific number may be selected by those skilled in the art based on application and capacity of the battery module.

Figure 6:
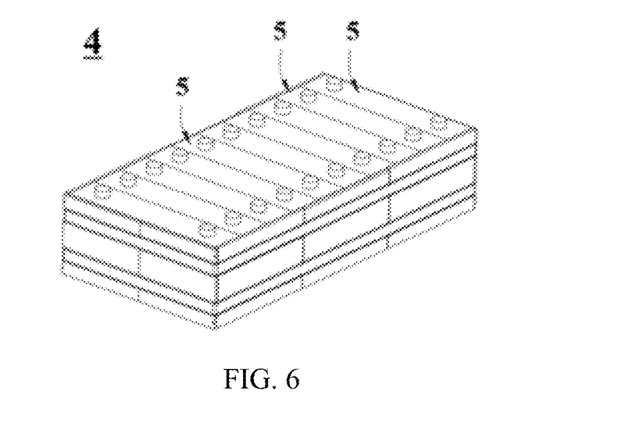
FIG. 6 is a schematic diagram of a battery module according to an embodiment of the present application.

FIG. 6 is a battery module 4 as an example. With reference to FIG. 6, in the battery module 4, a plurality of lithium ion batteries 5 may be sequentially provided along a length direction of the battery module 4. Certainly, the lithium ion batteries may also be provided in any other manner. Further, the plurality of lithium ion batteries 5 may be fixed with a fastener.

Optionally, the battery module 4 may further include a shell with an accommodating space, and the plurality of lithium ion batteries 5 are accommodated into the accommodating space.

In some embodiments, the above battery modules may be further assembled into a battery pack, and the number of battery modules included in the battery pack may be one or more, and the specific number may be selected by those skilled in the art according to application and capacity of the battery pack.

Figure 7:
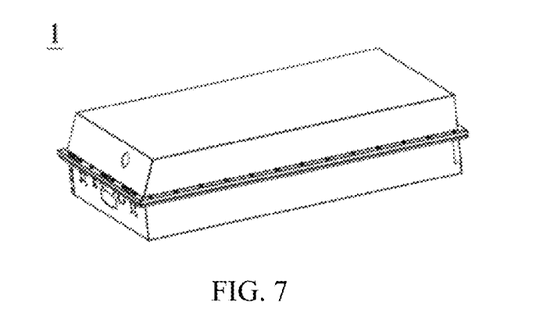
FIG. 7 is a schematic diagram of a battery pack according to an embodiment of the present application.
Figure 8:
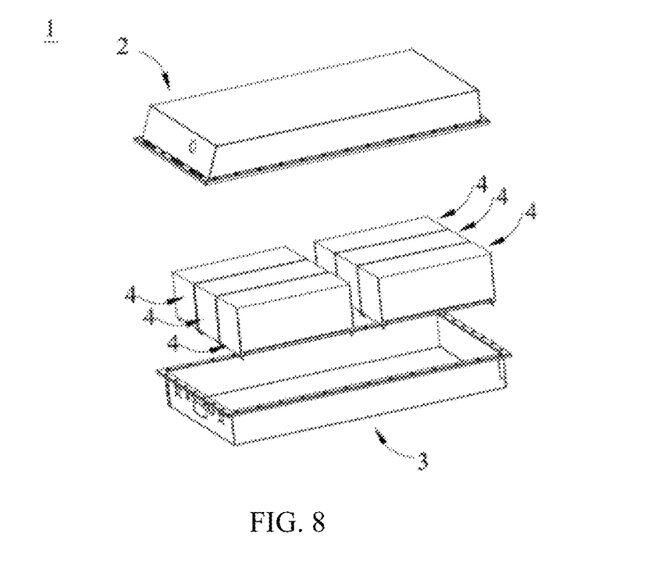
FIG. 8 is an exploded view of a battery pack according to an embodiment of the present application shown in FIG. 7.

FIG. 7 and FIG. 8 are respectively a battery pack 1 as an example. With reference to FIG. 7 and FIG. 8, the battery pack 1 may include a battery box and a plurality of battery modules 4 provided in the battery box. The battery box includes an upper box body 2 and a lower box body 3, and the upper box body 2 may cover the lower box body 3 and form an enclosed space for accommodating the battery modules 4. The plurality of battery modules 4 may be arranged in any manner in the battery box.

In addition, the present application further provides a power consumption apparatus, and the power consumption apparatus includes at least one of the secondary battery, the battery module, or the battery pack provided in the present application. The secondary battery, the battery module, or the battery pack may be used as a power source of the power consumption apparatus, or as an energy storage unit of the power consumption apparatus. The power consumption apparatus may include, but not be limited to, mobile devices (for example, mobile phones or notebook computers), electric vehicles (for example, pure electric vehicles, hybrid electric vehicles, plug-in hybrid electric vehicles, electric bicycles, electric scooters, electric golf carts, or electric trucks), electric trains, ships and satellites, energy storage systems, or the like.

As the power consumption apparatus, the secondary battery, the battery module, or the battery pack may be selected according to usage requirements thereof.

Figure 9:
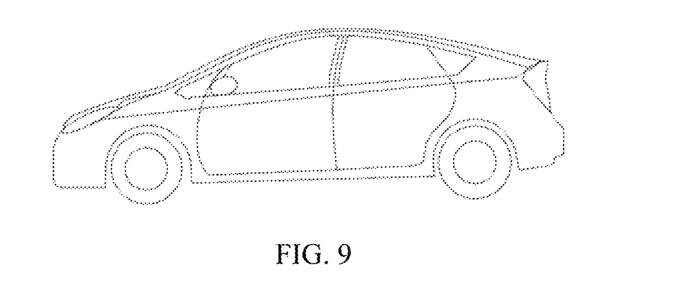
FIG. 9 is a schematic diagram of a power consumption apparatus using a secondary battery as a power source according to an embodiment of the present application.

FIG. 9 is a power consumption apparatus as an example. The power consumption apparatus is a pure electric vehicle, a hybrid electric vehicle, or a plug-in hybrid electric vehicle, etc. In order to meet a requirement of the power consumption apparatus for high power and a high energy density of a secondary battery, a battery pack or a battery module may be adopted.

As another example, an apparatus may be a mobile phone, a tablet computer, a notebook computer, or the like. The apparatus usually requires lightness and thinness, and a secondary battery may be used as a power source.

EMBODIMENTS

Embodiments of the present application are illustrated in the following. The embodiments described hereinafter are illustrative, which are only used to explain the present application, and should not be understood as limiting the present application. If no specific technique or condition is indicated in the embodiment, it shall be carried out in accordance with the technique or condition described in the literature in the art or in accordance with the product specification. Reagents or instruments used without manufacturers indicated are conventional products that may be obtained from the market.

The sources of raw materials involved in the embodiments of the present application are as follows:

| Name | Chemical Formula | Manufacturer | Specification |
|---|---|---|---|
| Elementary Silicon | Si | Dongguan Kaijin New Energy Technology Co., Ltd. | Dv50 is 1.5 μm |
| Silicon Monoxide | SiO | Dongguan Kaijin New Energy Technology Co., Ltd. | Dv50 is 1.5 μm |
| Graphite 1 | C | Jiangxi Zichen Technology Co., Ltd. | Graphitization Degree 91% |
| Graphite 2 | C | Jiangxi Ziehen Technology Co., Ltd. | Graphitization Degree 82% |
| Graphite 3 | C | Jiangxi Zichen Technology Co., Ltd. | Graphitization Degree 97% |
| Graphite 4 | C | Jiangxi Zichen Technology Co., Ltd. | Graphitization Degree 70% |
| Graphite 5 | C | Jiangxi Ziehen Technology Co., Ltd. | Graphitization Degree 99% |

-continued

| Name | Chemical Formula | Manufacturer | Specification |
|---|---|---|---|
| Glucose | $C_6H_{12}O_6$ | Aladdin | Analytical Purity |
| Polyvinylidene Fluoride | $(CH_2CF_2)_n$ | Aladdin | Mw ~400000 |
| N-Methyl-pyrrolidone | $C_5H_9NO$ | Aladdin | Analytical Purity |
| Fluoroethylene Carbonate | $C_3H_3FO_3$ | Aladdin | ≥98% |
| Lithium Hexafluorophosphate | $LiPF_6$ | Aladdin | ≥97% |

Embodiment 1

Dissolve 40 g of glucose in 200 ml of deionized water, then add 4.2 g of elemental silicon with a median particle size Dv50 of 1.5 μm and 155.8 g of graphite with a median particle size of Dv50 of 10 μm and a graphitization degree of 91% (designated as graphite 1). After stirring and mixing evenly at room temperature, continue stirring at 80° C. to remove a water solvent to obtain a muddy mixture. Transfer the muddy mixture to a heat treatment furnace at a temperature of 150° C., and pretreat it for 240 minutes to obtain a silicon carbon negative electrode material intermediate. Heat the silicon carbon negative electrode material intermediate at 900° C. for 240 minutes in a nitrogen atmosphere. After cooling to the room temperature, pulverize the obtained solid to obtain the desired silicon carbon negative electrode material.

[Counter Electrode]

A metal lithium sheet is adopted as a counter electrode.

[Preparation of Electrode Sheet]

Dissolve the silicon carbon negative electrode material, conductive agent acetylene black, conductive agent CNT (Carbon Nano Tube), binder styrene-butadiene rubber (SBR), thickener sodium carboxymethyl cellulose (CMC) of the embodiment 1 in solvent deionized water according to a weight ratio of 92:2:0.5:4.5:1, and prepare a negative electrode slurry after stirring and mixing evenly. Coat the negative electrode slurry evenly on a negative electrode current collector copper foil with a coating amount of 6 mg/cm², and obtain a negative electrode sheet after drying, cold pressing and slitting.

[Preparation of Electrolytic Solution]

In an argon atmosphere glove box ($H_2O$<0.1 ppm, $O_2$<0.1 ppm), mix an organic solvent ethylene carbonate (EC)/ethyl methyl carbonate (EMC) evenly according to a volume ratio of 3/7, add 10% (based on a weight of the ethylene carbonate/ethyl methyl carbonate organic solvent) fluoroethylene carbonate (FEC), and then add 12.5% (based on the weight of ethylene carbonate/ethyl methyl carbonate organic solvent) $LiPF_6$ lithium salt to dissolve in the organic solvent, the electrolytic solution of embodiment 1 is obtain after stirring evenly.

[Separator]

A polyethylene (PE) film is adopted as a separator.

[Preparation of Button Battery]

Stack a counter electrode, a separator and a negative electrode sheet in sequence, so that the separator is located between the counter electrode and the negative electrode sheet to play a role of isolation, and a bare cell is obtained by winding. Place the bare cell in an outer packing, and inject the prepared basic electrolytic solution and package it to obtain a button battery.

Preparation conditions of other embodiments and comparing embodiments of the present application are shown in Table 1 and Table 3. [Counter Electrode], [Preparation of Electrode Sheet], [Preparation of Electrolytic Solution], [Separator] and [Preparation of Button Battery] in the above embodiments and comparing embodiments are the same as a process of embodiment 1.

[Related Parameter Test]

Gram Capacity, First Coulombic Efficiency and Cycle Capacity Retention Tests:

Under an environment of 25° C. and normal pressure, discharge a button battery to 0.005 V at a constant current rate of 0.1 C, then discharge it to 0.005 V at a constant current of 0.04 C, stand for 10 minutes, and record a discharging capacity at this time, which is a lithium intercalation capacity of a first cycle, and then charge it to 1.5 V at a constant current rate of 0.1 C, stand for 10 min, and record a charging capacity at this time, which is a delithiation capacity of a first cycle and is defined as a gram capacity of a material, and this is a cycle of charging and discharging. Perform 50 cycles of charging and discharging tests on the button battery according to the above method, and record the delithiation capacity of each time.

First coulombic efficiency of button battery (%)=delithiation capacity of first cycle/lithium intercalation capacity of first cycle×100%;

Cycle capacity retention rate of button battery (%)=delithiation capacity of fiftieth cycle/delithiation capacity of first cycle×100%

Content of Silicon Test

A content of silicon in a negative electrode material in the present application may be measured by using instruments and methods known in the art. For example, with reference to EPA-3052-1996 "Microwave Acid Digestion of Silicate", digest a silicon carbon negative electrode material, and then according to EPA 6010D-2014 "Inductively Coupled Plasma Atomic Emission Spectrometry", use a ICAP-7000 inductively coupled plasma emission spectrometer (ICP-OES) of Thermo Fisher Scientific, United States, to measure the content of the silicon. A specific test method is as follows: microwave digest 0.5 g silicon carbon negative electrode material sample with 10 mL nitric acid with mass fraction of 65% and 10 mL hydrofluoric acid with mass fraction of 40%, add it to a 50 mL volumetric flask to fix volume after digesting, and then use ICAP-7000 ICP-OES to measure the content of the silicon.

Measurement Method of Pores Inside Silicon Particle:

1. Prepare a silicon carbon negative electrode material into a slurry, coat it on a current collector, and obtain an electrode sheet after drying.

2. Use a plasma cutting (Plasma Cutting) technology to cut the above negative electrode sheet to obtain a neat section, and observe the section under a scanning electron microscope equipped with an energy disperse spectroscopy (EDS, Energy Disperse Spectroscopy) apparatus. Randomly select 5 complete particles with a diameter >800 nm (a diameter of a circumscribed circle of the particle profile is a diameter of the particle) for analysis.

3. For each silicon particle, use an energy disperse spectroscopy technology to analyze composition of the particle. Determine whether it is the silicon particle according to the composition of the particle. An identification standard of the silicon particle in the following embodiments is as follows: if the content of the silicon in the particle is ≥7 wt %, it is determined to be the silicon particle.

4. Measure the pores inside each silicon particle. A measurement method is as follows: first, pores on an edge of a SEM image are not recorded as the number, but only the number of pores inside the SEM image is recorded. A diameter of a circumscribed circle of the pore inside the silicon particle is defined as a diameter of the pore, and if a diameter of the pore is 50 nm, it is recorded as one, until all pores inside the particle are completely measured, and the number of all pores inside the particle is summed up, then the summed value is defined as the total number of pores inside the silicon particle.

Graphitization Degree Test:

Gaphitization degree of the graphite in the present application may be tested by methods known in the art. For example, the graphitization degree may be tested by using an X-ray diffractometer (Bruker D8 Discover), the test may refer to JIS K 0131-1996, and JB/T 4220-2011 to measure a size of d002, and then calculate the graphitization degree according to a formula G=(0.344−d002)/(0.344−0.3354), where d002 is a layer spacing in an artificial graphite crystal structure expressed in nanometer (nm).

TABLE 1

Preparation Conditions of Embodiments

| Number | Carbon Source Additive Type | Dosage/% | Solvent | Silicon Source Silicon Type | Dosage | Carbon Source Type | Dosage | Preheat Treatment Temperature (°C.) |
|---|---|---|---|---|---|---|---|---|
| Embodiment 1 | Glucose | 20% | Water | Elementary Silicon | 2.1% | Graphite 1 | 77.9% | 150 |
| Embodiment 2 | Glucose | 20% | Water | Elementary Silicon | 2.5% | Graphite 1 | 77.5% | 150 |
| Embodiment 3 | Glucose | 20% | Water | Elementary Silicon | 4.2% | Graphite 1 | 75.8% | 150 |
| Embodiment 4 | Glucose | 20% | Water | Elementary Silicon | 5.9% | Graphite 1 | 74.1% | 150 |
| Embodiment 5 | Glucose | 20% | Water | Elementary Silicon | 8.5% | Graphite 1 | 71.5% | 150 |
| Embodiment 6 | Glucose | 20% | Water | Elementary Silicon | 4.2% | Graphite 4 | 75.8% | 150 |
| Embodiment 7 | Glucose | 20% | Water | Elementary Silicon | 4.2% | Graphite 2 | 75.8% | 150 |
| Embodiment 8 | Glucose | 20% | Water | Elementary Silicon | 4.2% | Graphite 3 | 75.8% | 150 |
| Embodiment 9 | Glucose | 20% | Water | Elementary Silicon | 4.2% | Graphite 5 | 75.8% | 150 |
| Embodiment 10 | Glucose | 20% | Water | Elementary Silicon | 4.2% | Graphite 2 | 75.8% | 100 |
| Embodiment 11 | Glucose | 20% | Water | Elementary Silicon | 4.2% | Graphite 1 | 75.8% | 300 |
| Embodiment 12 | Glucose | 20% | Water | Elementary Silicon | 4.2% | Graphite 3 | 75.8% | 400 |
| Embodiment 13 | Phenolic Resin | 10% | Ethanol | Elementary Silicon | 4.8% | Graphite 1 | 85.2% | 100 |
| comparing embodiment 1 | Glucose | 20% | Water | Elementary Silicon | 4.2% | Graphite 1 | 75.8% | 500 |
| comparing embodiment 2 | Glucose | 20% | Water | Elementary Silicon | 11.0% | Graphite 1 | 69.0% | 100 |
| comparing embodiment 3 | Glucose | 20% | Water | SiO | 6.7% | Graphite 1 | 73.3% | 150 |

Remark graphitization degree of graphite 1: 91%; graphitization degree of graphite 2: 82%; graphitization degree of graphite 3: 97%; graphitization degree of graphite 4: 70%; graphitization degree of graphite 5: 99%.

TABLE 2

Properties of Secondary Battery Produced with Positive Material of Embodiments

| Number | Silicon Content | Y/X | Gram Capacity mAh/g | First Coulombic Efficiency | Capacity Retention Rate for 50 Cycles |
|---|---|---|---|---|---|
| Embodiment 1 | 2.5% | 3.5 | 406.0 | 91.2% | 97.2% |
| Embodiment 2 | 3% | 4.5 | 421.5 | 91.2% | 97.2% |
| Embodiment 3 | 5% | 5.6 | 482.0 | 91.1% | 97.1% |
| Embodiment 4 | 7% | 9 | 541.4 | 89.0% | 90.6% |
| Embodiment 5 | 10% | 15 | 621.6 | 87.6% | 85.0% |
| Embodiment 6 | 5% | 9.2 | 400.9 | 82.4% | 87.8% |
| Embodiment 7 | 5% | 7.3 | 427.2 | 87.0% | 92.1% |
| Embodiment 8 | 5% | 4.2 | 488.8 | 88.6% | 91.2% |
| Embodiment 9 | 5% | 3.9 | 495.1 | 87.9 | 89.5% |
| Embodiment 10 | 5% | 8 | 437.4 | 89.1% | 91.9% |
| Embodiment 11 | 5% | 4.4 | 456.5 | 85.6% | 94.3% |
| Embodiment 12 | 5% | 3.7 | 459.3 | 82.6% | 91.2% |
| Embodiment 13 | 5% | 5.8 | 482.2 | 92.0% | 97.0% |
| comparing embodiment 1 | 5% | 2.1 | 351.1 | 65.4% | 64.3% |
| comparing embodiment 2 | 13% | 18 | 697.8 | 87.3% | 51.2% |
| comparing embodiment 3 | 5% | 0.4 | 397.1 | 81.5% | 79.0% |

TABLE 3

Changes in Relevant Parameters of Obtained Silicon Carbon Negative Electrode Material

| Number | Number of Pores With Diameter Greater Than 50 nm | DV50 value of Silicon Carbon Negative Electrode Material | BET Value of Silicon Carbon Negative Electrode Material (m2/g) |
|---|---|---|---|
| Embodiment 14 | 0 | 12 | 1.5 |
| Embodiment 15 | 5 | 12 | 1.5 |
| Embodiment 16 | 10 | 12 | 1.5 |
| Embodiment 17 | 0 | 10 | 1.5 |
| Embodiment 18 | 0 | 11 | 1.5 |
| Embodiment 19 | 0 | 14 | 1.5 |
| Embodiment 20 | 0 | 15 | 1.5 |
| Embodiment 21 | 0 | 12 | 1 |
| Embodiment 22 | 0 | 12 | 1.1 |
| Embodiment 23 | 0 | 12 | 2 |
| Embodiment 24 | 0 | 12 | 3 |
| comparing embodiment 4 | 30 | 12 | 1.5 |
| comparing embodiment 5 | 0 | 18 | 1.5 |
| comparing embodiment 6 | 0 | 12 | 3.5 |

According to Table 1 and Table 2, it can be seen that a battery prepared by using the silicon carbon negative electrode material of embodiments 1-11 have high gram capacity, high first coulombic efficiency and fine cycle capacity retention rate.

It can be seen from embodiments 1-11 that when a Y/X ratio of the silicon carbon negative electrode material is in a range of 3.5-15, the cycle capacity retention rate of the secondary battery is significantly better than that of comparing embodiments 1-3 whose Y/X ratio is not in this range.

It can be seen from embodiments 1-5 and comparing embodiment 2 that as a content of silicon gradually increases, the gram capacity of the secondary battery is also increasing, but when the content of the silicon exceeds 10% (comparing embodiment 2), the cycle capacity retention rate of the secondary battery significantly decreases.

It can be seen from embodiment 3 and embodiments 6-9 that as the graphitization degree of the carbon source increases from 70% to 99%, the gram capacity of the corresponding battery gradually increases, and the first coulombic efficiency and cycle capacity retention rate first increase and then decrease. When the graphitization degree of the carbon source is 82%-97%, overall performance of the battery is better.

It can be seen from embodiment 10 and embodiment 7, embodiment 3 and embodiment 11, and embodiment 8 and embodiment 12 that as pretreatment temperature increases from 100° C. to 400° C., the gram capacity and first coulombic efficiency of the corresponding battery gradually decrease, but the cycle capacity retention rate keeps increasing first and then decreasing. It can be seen from embodiment 3 and comparing embodiment 1 that as the pretreatment temperature increases from 150° C. to 500° C., various performance of the corresponding battery is significantly deteriorated.

TABLE 4

Performance of Secondary Battery Produced with Positive Electrode Material of Embodiments

| Number | Content of Silicon | Y/X | Gram Capacity | First Coulombic Efficiency | Capacity Retention Rate for 50 Cycles |
|---|---|---|---|---|---|
| Embodiment 14 | 5% | 5.6 | 482.0 | 91.1% | 97.1% |
| Embodiment 15 | 5% | 5.5 | 481.3 | 91.1% | 97.0% |
| Embodiment 16 | 5% | 5.5 | 477.8 | 91.0% | 97.0% |
| Embodiment 17 | 5% | 5.7 | 443.1 | 87.3% | 93.0% |
| Embodiment 18 | 5% | 5.6 | 479.9 | 90.4% | 96.8% |
| Embodiment 19 | 5% | 5.6 | 478.7 | 90.8% | 96.5% |
| Embodiment 20 | 5% | 5.6 | 462.5 | 88.0.% | 92.1% |
| Embodiment 21 | 5% | 5.6 | 460.0 | 89.8% | 93.5% |
| Embodiment 22 | 5% | 5.6 | 478.6 | 91.0% | 96.9% |
| Embodiment 23 | 5% | 5.6 | 478.9 | 90.7% | 97.0% |
| Embodiment 24 | 5% | 5.5 | 465.4 | 91.1% | 94.1% |
| Comparing Embodiment 4 | 5% | 5.4 | 455.0 | 80.1% | 53.2% |
| Comparing Embodiment 5 | 5% | 5.6 | 412.2 | 84.0.% | 72.5% |
| Comparing Embodiment 6 | 5% | 5.3 | 447.6 | 84.6% | 80.1% |

It can be seen from Table 3 and Table 4 that the gram capacity, first coulombic efficiency and cycle capacity retention rate of embodiments 14-24 are significantly better than those of comparing embodiments 4-6.

It can be seen from embodiments 14-16 and comparing embodiment 4 that when the number of pores with a diameter greater than 50 nm in a single silicon carbon negative electrode material is less than 10, battery performance does not significantly change, but as the number of pores continues to increase to 30, the gram capacity and first coulombic efficiency significantly decrease, and the capacity retention rate decreases more obviously after 50 cycles.

It can be seen from embodiments 17-20 and comparing embodiment 5 that compared with the median particle size Dv50 of the silicon carbon negative electrode material being 10 μm-15 μm, the battery performance is better when the median particle size is 18 μm. And when the median particle size is 11 μm-14 μm, improvement of the battery performance is more obvious.

It can be seen from embodiments 21-24 and comparing embodiment 6 that compared with the specific surface area of the silicon carbon negative electrode material being 1 $m^2$-3 $m^2$, the battery performance is better when the specific surface area is 3.5. And when the specific surface area is 1.1 $m^2$-2 $m^2$, the improvement of the battery performance is more obvious.

It is noted that the present application is not limited to the foregoing embodiments. The above embodiments are merely examples, and embodiments having substantially the same configuration as the technical idea and exerting the same effects within the scopes of the technical solutions of the present application are all included in the technical scope of the present application. In addition, without departing from the theme of the present application, application of various modifications that may be conceived by those skilled in the art to the embodiments and other modes constructed by combining some of the constituent elements of the embodiments are also included in the scope of the present application.

What is claimed is:

1. A silicon carbon negative electrode material, wherein, a battery composed of a negative electrode prepared by the silicon carbon negative electrode material as a working electrode, metal lithium as a counter electrode and an electrolyte containing a lithium ion conductive substance is charged and discharged, and in a case of drawing a relationship graph between a differential value dQ/dV obtained by differentiating a charging and discharging capacity Q by a working electrode potential V and the working electrode potential V, when energizing the negative electrode material in a direction of delithiation, a ratio of a maximum Y of dQ/dV between 400-480 mV to a maximum X of dQ/dV between 200-255 mV is in a range of 3.5 to 15, the silicon carbon negative electrode material has no pores or a number of pores with a diameter greater than 50 nm in a single silicon carbon negative electrode material particle is less than 10, a content of the silicon is in a range of 2.5% to 10%, based on a total weight of the silicon carbon negative electrode material, a median particle size Dv50 of the silicon carbon negative electrode material is in a range of 10 μm to 15 μm, and a specific surface area of the silicon carbon negative electrode material is in a range of 1 $m^2$ to 3 $m^2$.

2. The silicon carbon negative electrode material according to claim 1, wherein, in an X-ray diffraction pattern, a ratio of an intensity of a peak at 28.4 at 2θ to an intensity of a peak at 54.6 at 2θ is in a range of 1.1 to 4.5.

3. A secondary battery, comprising the silicon carbon negative electrode material according to claim 1.

4. A power consumption apparatus, comprising the secondary battery according to claim 3.

* * * * *